United States Patent Office 3,156,726
Patented Nov. 10, 1964

3,156,726
ACETYLENIC AMINES
Kent C. Brannock and Robert D. Burpitt, both of Kingsport, Tenn., assignors to Eastman Kodak Company, Rochester, N.Y., a corporation of New Jersey
No Drawing. Filed Sept. 19, 1961, Ser. No. 139,050
2 Claims. (Cl. 260—570.8)

This invention relates to organic compounds and more particularly to novel acetylenic amines.

The compounds of the invention are of the general structure

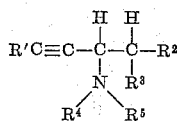

wherein R' is a phenyl or substituted phenyl radical, $R^2$ and $R^3$ are hydrogen, monovalent hydrocarbon radicals, or divalent hydrocarbon radicals which, with the carbon atom to which they are attached, form a 5- or 6-membered, saturated carbocyclic ring, and $R^4$ and $R^5$ are monovalent hydrocarbon radicals or divalent organic radicals which, with the nitrogen atom to which they are attached, form a 5- or 6-membered, saturated heterocyclic ring.

In the above formula R' is preferably a phenyl radical but can also be a substituted phenyl radical having one or more substituents such as lower alkyl radicals.

$R^2$, $R^3$, $R^4$, and $R^5$ are typically the same or different monovalent radicals such as hydrogen or alkyl, cycloalkyl, or aryl radicals having from about 1 to 8 carbon atoms. In addition, $R^2$ and $R^3$ can be alkylene radicals which, with the carbon atom to which they are attached, form a cyclopentyl or cyclohexyl radical. $R^4$ and $R^5$ can also be divalent radicals which, with the nitrogen atom to which they are attached, form a heterocyclic radical such as morpholino, pyrrolidinyl or piperidino.

The compounds of the invention can be prepared by the reaction of an acetylenic compound with an enamine. The reaction can be represented by the following equation:

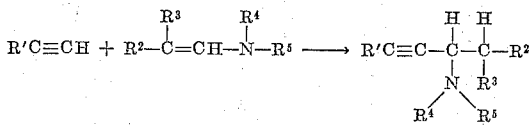

wherein R', $R^2$, $R^3$, $R^4$ and $R^5$ are radicals of the types stated above. The reaction can be carried out by heating approximately equimolar amounts of the reactants at reflux temperature, preferably in the presence of a catalyst such as cuprous chloride. The reaction can also be carried out in the absence of a catalyst by heating the reactants at reflux temperature for several hours, but the use of a catalyst is preferred to increase the reaction rate.

Acetylenic compounds suitable for the above reaction include phenylacetylene and closely related ring-substituted phenylacetylenes, such as those having one or more lower alkyl substituents on the phenyl group. The enamine reactant can be selected from a broad class of enamines of the type

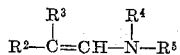

One type of suitable enamine is the type having no β-hydrogen atoms, which can be prepared by reacting an aldehyde having one α-hydrogen atom with a secondary amine. Typical enamines of this type include: N,N-dimethylisobutenylamine, N,N-diethylisobutenylamine, N,N-dibutylisobutenylamine, N-isobutenylpiperidine, N-isobutenylpyrrolidine, N,N-dimethyl-2-methylbutenylamine, N - (2 - methylbutenyl)piperidine, N,N - dimethyl - 2-ethylbutenylamine, N - (2 - ethylbutenyl)piperidine, N-(methylenecyclohexyl)dimethylamine, N - (methylenecyclohexyl)piperidine, N - isobutenylmorpholine, N - (2-ethylhexenyl)morpholine, N - (2 - ethylhexenyl)piperidine, N,N-dimethyl-2-ethylhexenylamine, and the like.

Another suitable type of enamine is the type having at least one hydrogen atom and on the β-carbon atom, which can be prepared by reacting a secondary amine with an aldehyde having at least two α-hydrogen atoms. Examples of such enamines include: N-(1-butenyl)-piperidine, N,N-dimethylvinylamine, N,N-dimethylpropenylamine, N-(1-butenyl)pyrrolidine, N,N-dimethyl-1-butenylamine, N,N - dibutyl - 1 - butenylamine, N - (1-heptenyl)morpholine, and the like.

Our invention is illustrated by the following examples:

Example 1

Phenylacetylene (13.5 g.) and N,N-dimethylisobutenyl amine (13.5 g.) were combined and heated under reflux for 10 hours during which time the temperature rose from 103 to 150°. The mixture was then heated at 150° for an additional 4.5 hours and distilled to give 21 g. (79%) of 3-dimethylamino-4-methyl-1-phenyl-1-pentyne, B.P. 78–80° at 0.5 mm., $N_D^{20}$ 1.5263.

Example 2

N,N-dimethylisobutenylamine (25 g.), cuprous chloride (1 g.) and phenyl acetylene (25 g.) were combined. There was a mild evolution of heat, and the temperature rose to 46° over a ½-hour period. The flask was then warmed gently on the steam bath and an exothermic reaction took place with the temperature rising to 130° in about 5 minutes. The mixture was cooled, filtered and distilled to give 34 g. (68%) of 3-dimethylamino-4-methyl-1-phenyl-1-pentyne.

The novel compounds of our invention are useful as pharmaceuticals and as pharmaceutical intermediates. For example, 3-dimethylamino-4-methyl-1-phenyl-1-pentyne is useful as an analgesic. It can also be converted to its non-toxic acid salts such as the hydrochloride salt, the phosphate or the citrate for pharmaceutical use, particularly as an analgesic.

The invention has been described in detail with particular reference to preferred embodiments thereof, but it will be understood that variations and modifications can be effected within the spirit and scope of the invention as described hereinabove and as defined in the appended claims.

We claim:
1. Compounds of the formula

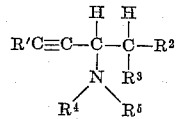

wherein R' is selected from the group consisting of phenyl and lower alkyl-substituted phenyl radicals; $R^2$ and $R^3$ are selected from the group consisting of hydrogen, alkyl radicals of one to eight carbon atoms, and alkylene radicals which, with the carbon atom to which they are attached, form a 5- to 6-membered saturated carbocyclic ring; and $R^4$ and $R^5$ are selected from the group consisting of alkyl radicals of one to eight carbon atoms and divalent organic radicals which, with the nitrogen atom to which they are attached, form a 5- to 6-membered, saturated heterocyclic ring from the group consisting of morpholino, pyrrolidinyl and piperidino.

2. 3-dimethylamino-4-methyl-1-phenyl-1-pentyne.

References Cited in the file of this patent
UNITED STATES PATENTS
3,007,933    Hennion _____ Nov. 7, 1961